United States Patent
Good (10) Patent No.: US 9,351,020 B2
(45) Date of Patent: May 24, 2016

(54) ON THE FLY TRANSCODING OF VIDEO ON DEMAND CONTENT FOR ADAPTIVE STREAMING (71) Applicant: Wowza Media Systems, LLC, Evergreen, CO (US)

(72) Inventor: Charles F. Good, Cincinnati, OH (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 14/487,853

(22) Filed: Sep. 16, 2014

(65) Prior Publication Data
US 2015/0007237 A1    Jan. 1, 2015

Related U.S. Application Data (63) Continuation of application No. 13/842,207, filed on Mar. 15, 2013, now Pat. No. 8,869,218.

(51) Int. Cl.
*H04N 21/2343* (2011.01)
*H04N 21/24* (2011.01)
*H04N 21/472* (2011.01)
*H04N 21/8543* (2011.01)
*H04L 29/06* (2006.01)
*H04N 21/2183* (2011.01)
*H04N 21/2225* (2011.01)
*H04N 21/231* (2011.01)

(52) U.S. Cl.
CPC ...... *H04N 21/234309* (2013.01); *H04L 65/607* (2013.01); *H04N 21/2183* (2013.01); *H04N 21/2225* (2013.01); *H04N 21/2343* (2013.01); *H04N 21/23106* (2013.01); *H04N 21/23439* (2013.01); *H04N 21/2408* (2013.01); *H04N 21/47202* (2013.01); *H04N 21/8543* (2013.01)

(58) Field of Classification Search
CPC ............... H04N 21/2343; H04N 21/23439; H04N 21/234309
See application file for complete search history.

(56) References Cited

U.S. PATENT DOCUMENTS 7,292,602 B1    11/2007    Liu et al.
7,295,608 B2    11/2007    Reynolds et al.
(Continued)

OTHER PUBLICATIONS

"How to Set Up Video On Demand Streaming", WOWZA Media Systems, http://www.wowza.com/forums/content.php?3, published Oct. 1, 2010, retrieved Mar. 7, 2013, 7 pages.
(Continued)

*Primary Examiner* — Robert Hance
(74) *Attorney, Agent, or Firm* — Toler Law Group, PC (57) ABSTRACT A method includes receiving a request at a media server from a computing device for a portion of a particular rendition of content that is available for adaptive streaming. The request received while the media server has access to a single rendition of the content. When the portion is part of the single rendition, the media server sends the portion retrieved from the single rendition to the computing device in response to the request. When the portion is not part of the single rendition, the media server generates the portion by transcoding a corresponding portion of the single rendition of the content, stores the generated portion in a cache of the media server, and sends the generated portion to the computing device in response to the request. The method further includes removing portions of one or more outdated renditions from the cache while maintaining the generated portion in the cache.

20 Claims, 4 Drawing Sheets

(56) References Cited

U.S. PATENT DOCUMENTS

| | | | | |
|---|---|---|---|---|
| 7,830,800 | B1* | 11/2010 | Masterson | H04N 21/64738 370/232 |
| 7,904,594 | B2 | 3/2011 | Spicer et al. | |
| 8,018,955 | B2 | 9/2011 | Agarwal et al. | |
| 8,276,180 | B1* | 9/2012 | Slavenburg | H04N 21/2343 725/36 |
| 8,392,583 | B2* | 3/2013 | Bijwaard | H04N 21/6405 709/227 |
| 2003/0066084 | A1* | 4/2003 | Kaars | G11B 20/12 725/89 |
| 2004/0098463 | A1* | 5/2004 | Shen | G06F 17/30902 709/213 |
| 2005/0246451 | A1* | 11/2005 | Silverman | G11B 27/034 709/231 |
| 2007/0112826 | A1* | 5/2007 | Laksono | G11B 20/00007 |
| 2008/0052415 | A1* | 2/2008 | Kellerman | H04L 29/06027 709/246 |
| 2009/0303098 | A1 | 12/2009 | Wilkins | |
| 2010/0114921 | A1* | 5/2010 | Bocharov | H04L 29/06027 707/758 |
| 2011/0083157 | A1* | 4/2011 | Addair | H04N 7/173 725/120 |
| 2012/0047542 | A1* | 2/2012 | Lewis | H04N 21/44016 725/97 |
| 2012/0254456 | A1* | 10/2012 | Visharam | H04N 21/2343 709/231 |
| 2012/0265853 | A1 | 10/2012 | Knox et al. | |
| 2012/0314761 | A1 | 12/2012 | Melnyk et al. | |
| 2014/0052846 | A1* | 2/2014 | Scherkus | H04N 21/44209 709/224 |

OTHER PUBLICATIONS

"Spectrum Session Delivery Control", Spectrum v.2.1 Product Overview; SeaWell Networks, http://www.seawellnetworks.com/wp-content/uploads/downloads/2013/02/spectrum-product-brief-v8.pdf, retrieved Mar. 7, 2013, pp. 1-2.

"Stream On-Demand Media (HTTP)", Adobe Media Server 5.0.1 Developer's Guide, http://help/adobe/com/en_US/adobemediaserver/devguide/WS36639d9e8574ac3f474112621 2dea232fa8-8000.2.3html, retrieved Mar. 7, 2013, 2 pages.

"Stream Packaging for Universal Streaming", SOLA Vision: Product Brief, Akamai Technologies, Inc., http://www.akamai.com/dl/brochures/stream_packaging_universal_streaming.pdf, retrieved Mar. 7, 2013, 2 pages.

"Transcoding for VoD", SOLA Vision Product Brief; Akamai Technologies, Inc., http://www.akamai.com/dl/brochures/sola_vision_transcoding_brief.pdf, retrieved Mar. 7, 2013, 2 pages.

* cited by examiner

| Transcoding Template(s) |  |
| --- | --- |
| ⋮ |  |

210

| Enable | True |
| --- | --- |
| Rendition Name | 720p |
| Stream Name | mp4:${SourceStreamName}_720p |
| Transcoder | Default |
| GPU ID | 1 |
| Video Bitrate (bps) | 1300000 |
| Frame Size | 1280x720 |
| Frame Fit | Fit-Height |
| Frame Rate | 24 fps |
| Video CODEC | H.264 |
| Key frame interval | FollowSource |
| Audio CODEC | AAC |
| Audio Sample Freq. | 48000 |
| No. Audio Channels | 5.1 |
| Audio Bitrate (bps) | 96000 |

220

| Enable | True |
| --- | --- |
| Rendition Name | 240p |
| Stream Name | mp4:${SourceStreamName}_240p |
| Transcoder | Default |
| GPU ID | 1 |
| Video Bitrate (bps) | 350000 |
| Frame Size | 320x240 |
| Frame Fit | Fit-Height |
| Frame Rate | 24 fps |
| Video CODEC | H.264 |
| Key frame interval | 60 |
| Audio CODEC | AAC |
| Audio Sample Freq. | 16000 |
| No. Audio Channels | 2 |
| Audio Bitrate (bps) | 60000 |

230

| Enable | False |
| --- | --- |
| Rendition Name | Audio Only (AAC) |
| Stream Name | mp4:{SourceStreamName}_aac |
| Audio CODEC | Pass Through |
| Audio Sample Freq. | 16000 |
| No. Audio Channels | 2 |
| Audio Bitrate (bps) | 48000 |

ON THE FLY TRANSCODING OF VIDEO ON DEMAND CONTENT FOR ADAPTIVE STREAMING

CROSS-REFERENCE TO RELATED APPLICATIONS

The present application is a continuation of and claims priority to U.S. patent application Ser. No. 13/842,207, filed Mar. 15, 2013 and entitled "ON THE FLY TRANSCODING OF VIDEO ON DEMAND CONTENT FOR ADAPTIVE STREAMING", the content of which is incorporated by reference in its entirety.

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

For example, content can be streamed from a content source to a destination device. Due to the variety of device types, device sizes, and encoding technologies available to consumers, making a particular content item available for streaming may involve storing multiple replicas of the content item (each replica specific to a device type, a device size, and/or an encoding technology). Storage and management of the replicas may be further complicated when adaptive streaming is supported. Adaptive streaming enables a media player to request different versions of a media stream in response to changes in network conditions. To support adaptive streaming, each replicated version of a content item may be broken down into multiple parts that are key frame aligned. Thus, to offer adaptive streaming of a single content item to multiple types of devices, a content provider may need to store and manage hundreds or even thousands of files.

SUMMARY

Systems and methods of performing on the fly transcoding of video on demand (VOD) content are disclosed. The ability to perform transcoding on the fly may simplify storage and management involved with supporting adaptive streaming of VOD content. In accordance with the described techniques, a media server may store only a single rendition of a video on demand (VOD) item (e.g., a television show, a movie, etc.). The stored rendition may correspond to a "best available" version (e.g., highest available bitrate, aspect ratio, etc.) of the VOD item. Even though the media server stores only the single rendition, the media server offers multiple renditions (e.g., bitrates) of the VOD item for adaptive streaming. When the media server receives a request for a portion of a particular rendition of the VOD item, the media server generates the requested portion of the requested rendition on the fly by transcoding a corresponding portion of the stored rendition of the VOD item. It will be appreciated that by generating requested VOD item portions on the fly, the amount of storage required to implement adaptive streaming of VOD content may be reduced significantly.

The media server may optionally utilize a caching mechanism to temporarily store portions of the VOD item that are generated on the fly. The caching mechanism may enable the cached portions to be re-used (without performing another transcoding operation) if the same bitrate is requested later.

DETAILED DESCRIPTION

Figure 1:
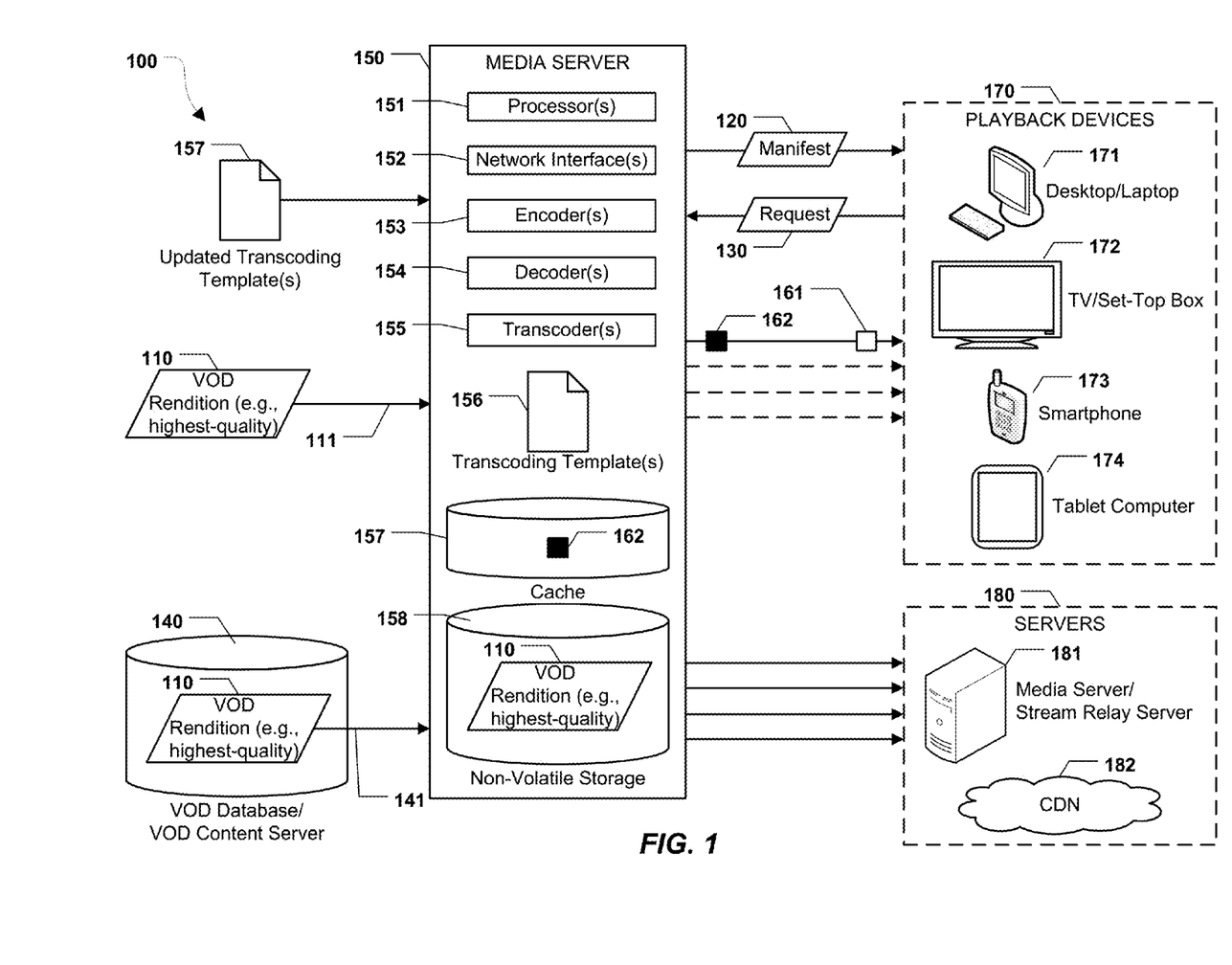
FIG. 1 is a diagram to illustrate a particular embodiment of a system that is operable to perform on the fly transcoding of VOD content for adaptive streaming.

FIG. 1 is a diagram to illustrate a particular embodiment of a system 100 that is operable to perform on the fly transcoding of video on demand (VOD) content for adaptive streaming. The system 100 includes a media server 150. The media server 150 is configured to send and receive data from various other devices (e.g., via a network, such as a local area network (LAN) or the Internet). For example, the media server 150 may communicate with one or more playback devices 170 (e.g., devices that are configured to stream VOD content) and one or more other servers 180.

It should be noted that although various operations described herein are described with reference to "video" on demand, this is for example only. The described systems and methods may also be used to perform on the fly transcoding of audio items. Thus, the term "video on demand" includes audio-only, video-only, and audio-video content.

The media server 150 may include one or more processors 151 and various components that are executable by the processor(s) 151. The media server 150 may correspond to software application(s) that perform media serving or processing, hardware systems (e.g., servers) that support or perform media serving and processing, or any combination thereof. Thus, various operations described with reference to the media server 150, or components thereof, may be implemented using hardware, software (e.g., instructions executable by the processor(s) 151), or any combination thereof.

The media server 150 may include one or more network interfaces 152. For example, the network interface(s) 152 may include input interface(s) and output interface(s) that are configured to receive data and to send data, respectively. In a particular embodiment, the network interface(s) 152 may be wired and/or wireless interfaces that enable the media server 150 to communicate data via a network, such as the Internet. For example, the network interface(s) 152 may include an Ethernet interface, a wireless interface compatible with an Institute of Electrical and Electronics Engineers (IEEE) 802.11 (e.g., Wi-Fi) protocol, or other wired or wireless interfaces.

The media server 150 may also include one or more encoders 153, decoders 154, and transcoders 155, each of which may be implemented using hardware or software. For example, one or more of the encoder(s) 153, decoder(s) 154, and transcoder(s) 155 may be implemented using Java classes (e.g., executable by a Java Virtual Machine (JVM)), C++ instructions, C instructions, etc. The decoder(s) 154 may decode data received by the media server 150. For example, the decoder(s) 154 may decode received streams (e.g., live audio-only, video-only, or audio-video streams) and files (e.g., VOD items). The encoder(s) 153 may encode data that is to be transmitted by the media server 150. The encoder(s) 153 and decoder(s) 154 may thus enable the media server 150 to process data in accordance with multiple coding technologies and protocols.

For example, the media server 150 may support video encoding types including, but not limited to, H.264, On2 VP6, Sorenson Spark, Screen video, Screen video 2, motion picture experts group (MPEG) 2 (MPEG-2), and MPEG-4 Part 2. The media server 150 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 150 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 150 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 150 may include non-volatile storage 158 (e.g., disk-based storage device(s)). In a particular embodiment, the non-volatile storage 158 may store a single rendition 110 of a VOD item. As used herein, a "rendition" of a VOD item may correspond to a particular version of the VOD item. Each rendition of a VOD item may have a distinct bitrate (e.g., video bitrate and/or audio bitrate). Renditions may also differ from each other with respect to other audio and video quality parameters, such as frame size, frame rate, video coder/decoder (CODEC), audio CODEC, number of audio channels, etc. In a particular embodiment, the stored rendition 110 is a "best available" version of the VOD item. For example, as shown at 111, the media server 150 may receive the rendition 110 from an external source, such as a content provider, where the rendition 110 is the highest-quality version of the VOD item that is available. To illustrate, the rendition 110 may be a high-definition (HD) rendition with a 1980×1024 pixel resolution and 5.1 or 7.1 channels of audio. It should be noted that although a rendition of only a single VOD item is shown in the non-volatile storage 158, this is for example only. The non-volatile storage 158 may store a single rendition of multiple VOD items, and the media server 150 may support adaptive streaming of multiple VOD items to multiple playback devices, as further described herein.

The transcoder(s) 155 may be configured to transcode the stored rendition 110 of the VOD item, or portions thereof, to generate additional renditions (or portions thereof). For example, the transcoder(s) 155 may transcode the high-quality stored rendition 110 to generate lower-quality renditions of the VOD item that are suitable for streaming in low-bandwidth network conditions. The transcoder(s) 155 may be configured to perform bitrate conversion, CODEC conversion, frame size conversion, etc. Moreover, such transcoding may be performed on the fly (e.g., just-in-time) in response to requests from playback devices. Thus, the media server 150 may be able to generate multiple renditions of VOD items on the fly, even though only a single rendition of each of the VOD items is stored in the non-volatile storage.

Depending on a format of the stored rendition 110, a playback format supported by a requesting device, and/or transcoding parameters in use by the transcoder(s) 155, a transcoding operation performed by the transcoder(s) 155 may trigger a decoding operation by the decoder(s) 154 and/or a re-encoding operation by the encoder(s) 153. In a particular embodiment, parameters used by the transcoder(s) 155 are stored in one or more transcoding templates 156. For example, the transcoding template(s) 156 may be computer-readable files (e.g., eXtensible markup language (XML) files) that define transcoding parameters (e.g., bitrate, type of CODEC, etc.) for various stream renditions. An illustrative example of a transcoding template is further described with reference to FIG. 2.

During operation, the media server 150 may perform on the fly transcoding of VOD items for adaptive streaming Adaptive streaming is a media transmission mechanism that enables a receiving device to dynamically request different versions of a stream in response to changing network conditions. For example, one of the playback devices 170 (e.g., a desktop or laptop computing device 171, a television or set-top box 172, a smartphone 173, or a tablet computer 174) may initiate an adaptive streaming session with the media server 150 for a particular VOD item. The media server 150 may send a manifest 120 to the initiating device (e.g., the computing device 171). The manifest 120 may include information describing each of a plurality of renditions of the particular VOD item that are available for adaptive streaming. For example, the transcoding template(s) 156 may define each of the available renditions, as further described with reference to FIG. 2, and the manifest 120 may be automatically generated based on the transcoding template(s) 156. When the stored rendition 110 is one of the renditions offered for adaptive streaming, requests for portions of the stored renditions are satisfied without performing transcoding. When the stored rendition 110 is not offered for adaptive streaming all requests for portions of the available renditions are satisfied using on the fly by transcoding of a corresponding portion of the stored rendition 110, as further described herein. Thus, although multiple renditions (e.g., bitrates) are described by the manifest 120 as being "available," at most only one of the available renditions is stored at the media server 150.

In the example of FIG. 1, the manifest 120 describes four available renditions of the VOD item (illustrated in FIG. 1 by four arrows between the media server 150 and the playback devices 170). However, it will be noted that only one of the arrows is solid, whereas the remaining arrows are dashed. This is to indicate that although four renditions are "available" only one of the renditions may be sent to a particular playback device 170 at any given time. Different renditions of the same VOD item may be sent to different playback devices at the same time. In alternate embodiments, more than four renditions or less than four renditions may be available for adaptive streaming Upon receiving the manifest 120, the computing device 171 may determine which of the available renditions of the VOD item should be requested from the media server 150. For example, the computing device 171 may make such a determination based on buffering/processing capability at the computing device 171 and/or network conditions being experienced by the computing device 171.

Upon determining which rendition should be requested, the computing device 171 may transmit a request 130 to the media server 150. The request 130 may specify a particular portion (e.g., portion "X") of the requested rendition. The particular portion may be specified using start/end frame numbers, start/end times, a portion number/identifier, etc. Depending on the adaptive streaming protocol in use, the requested portion may correspond to a "chunk" of a rendition and/or a group of pictures (GOP). A "chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the computing device 171 may request a subsequent portion (e.g., portion "X+1") of the same rendition of the VOD item. However, if playback and/or network conditions become worse, the computing device 171 may switch to a lower bitrate rendition by requesting subsequent portions of the lower bitrate rendition. Conversely, if playback and/or network conditions improve, the computing device 171 may switch to a higher bitrate rendition. The transcoder(s) 155 may generate key frame aligned portions for the adaptive streaming renditions, so that switching to a lower bitrate or higher bitrate rendition appears "seamless" (e.g., does not result in noticeable visual glitches or dropped frames at a playback device, such as the computing device 171, the television/set-top box 172, the smartphone 173, or the tablet computer 174).

Thus, during an adaptive streaming session, the media server 150 may receive a request 130 from the computing device 171 for a particular portion of a particular rendition (e.g., bitrate) of the VOD item. Upon receiving the request 130, the media server 150 may check whether the requested portion is part of the stored rendition 110. If so, the media server 150 may respond to the request 130 by retrieving the requested portion from the non-volatile storage 158 and transmitting the requested portion to the computing device 171. If the requested portion is part of a different rendition, the transcoder(s) 155 may generate the requested portion on the fly by transcoding a corresponding portion of the stored rendition 110. The requested portion of the requested rendition and the corresponding portion of the stored rendition 110 may have the same start and end frame numbers, the same start and end times, the same portion numbers or portion identifiers, etc. The transcoder(s) 155 may generate a portion 161 on the fly, and the generated portion 161 may be transmitted to the computing device 171 in response to the request 130. In a particular embodiment, sending the generated portion 161 to the computing device includes encoding and/or encapsulating the generated portion in accordance with the adaptive streaming protocol being used by the computing device 171 (e.g., HLS, HDS, smooth streaming, MPEG-DASH, etc.). As additional adaptive streaming requests are received from the computing device 171 for the same or other renditions of the VOD item, the transcoder(s) 155 may generate the additional requested portions on the fly as needed.

In a particular embodiment, the media server 150 may include a cache 157. For example, the cache 157 may be implemented using random access memory (RAM), disk-based memory, a file system-based cache, or any combination thereof, at the media server 150. When the media server 150 includes the cache 157, the transcoder(s) 155 may store generated portions of one or more renditions of VOD items in the cache 157. A cached portion may be re-used if the same portion (of the same rendition) is subsequently requested by the computing device 171 or another device. In the example of FIG. 1, the cache 157 stores a cached portion 162. It should be noted that the illustration of a single cached portion is for example only. The cache 157 may store multiple cached portions multiple renditions of multiple VOD items. In a particular embodiment, the cached portion 162 is stored in a format that is independent of the available output protocols (e.g., HLS, HDS, smooth streaming, MPEG-DASH, etc.). For example, the cached portion 162 may be stored in a fragmented MPEG-4 part 14 (MP4) format. Storing the cached portion 162 in the fragmented MP4 format may enable the cached portion 162 to be encoded/encapsulated using any of the supported output protocols. Cached portions may be removed from the cache 157 in accordance with a cache replacement policy (e.g., least recently used (LRU), least frequently used (LFU), etc.).

When the media server 150 includes the cache 157, responding to the request 130 may include checking the cache 157 to determine if the requested portion is in the cache 157. If the requested portion is in the cache, the media server 150 may transmit the cached portion to the computing device 171, which may take less time than generating the requested portion on the fly and transmitting the generated portion to the computing device 171. However, if the requested portion is not in the cache 157, the transcoder(s) 155 may generate the requested portion (as described above) and the generated portion may be stored in the cache 157 and sent to the requesting device.

In a particular embodiment, instead of storing the high-quality rendition 110 of the VOD item, the media server 150 may retrieve portions of the high-quality rendition 110 of the VOD item from a remote device as needed, as illustrated at 141. For example, the media server 150 may retrieve the rendition 110 (or portions thereof) from a VOD database or content server 140. VOD items may be retrieved via HTTP or network file system (NFS)-mounted disk.

The described techniques may also be used to generate and transmit multiple renditions of VOD items on the fly from the media server 150 to other servers 180. For example, the media server 150 may transmit generated renditions to another media server 181 or to a server (e.g., an edge server) of a content delivery network (CDN) 182. In alternate embodiments, more than four or less than four renditions may be transmitted. To illustrate, VOD access through the CDN 182 may be set up using a pull through caching mechanism. The CDN 182 may include one or more edge HTTP caching servers. If a cache miss for requested content occurs at a caching server, the caching server may pull the requested content from the media server 150, which acts as an origin server. The media server 150 may perform transcoding to generate the requested content.

In a particular embodiment, the media server 150 may support dynamic updates to transcoding parameters. For example, a user may edit the transcoding template(s) 156 or install/upload updated transcoding template(s) 157 to the media server 150. The updated transcoding template(s) 157 may include one or more updated transcoding parameters that describe an updated rendition of a VOD item. For example, the updated transcoding template(s) 157 may indicate that a bitrate of a rendition of "medium quality" is to be increased from 500 kilobits per second to 550 kilobits per second. In response to a subsequent request for a portion of the "medium quality" rendition, the transcoder(s) 155 may generate the portion based on the updated transcoding parameter(s) (e.g., at a bitrate of 550 kilobits per second). Any cached portions corresponding to the "old" rendition (e.g., encoded at 500 kilobits per second) may be removed from the cache 157 during normal operation, in accordance with the cache replacement policy in effect. Alternately, a one-time purge operation may be performed to identify and delete any cached portions corresponding to the old rendition.

The system 100 of FIG. 1 may thus enable on the fly generation of VOD renditions for adaptive streaming. It will be appreciated that by generating requested portions of VOD renditions on the fly, the system 100 of FIG. 1 may reduce the amount of storage space and the number of files involved in implementing adaptive streaming for VOD items.

To illustrate, a content provider (e.g., television or movie studio) may own a content library of files that have bitrates that are too high to stream to users over the Internet or cellular networks. Without access to the on the fly transcoding system 100 of FIG. 1, the need to convert and store multiple renditions of each file may represent a significant barrier that prevents the content provider from monetizing the content library (e.g., by charging fees for adaptive streaming of the content). The content provider may use the system 100 of FIG. 1 to make the library of content available for adaptive streaming without having to pre-convert and pre-store additional renditions of the content.

As another example, a user or content provider may have multimedia in a legacy format that is incompatible with adaptive streaming protocols. The system 100 of FIG. 1 may be used to ingest such legacy media and to make the legacy media available for adaptive streaming without pre-converting or pre-storing additional renditions of the media.

Figure 2:
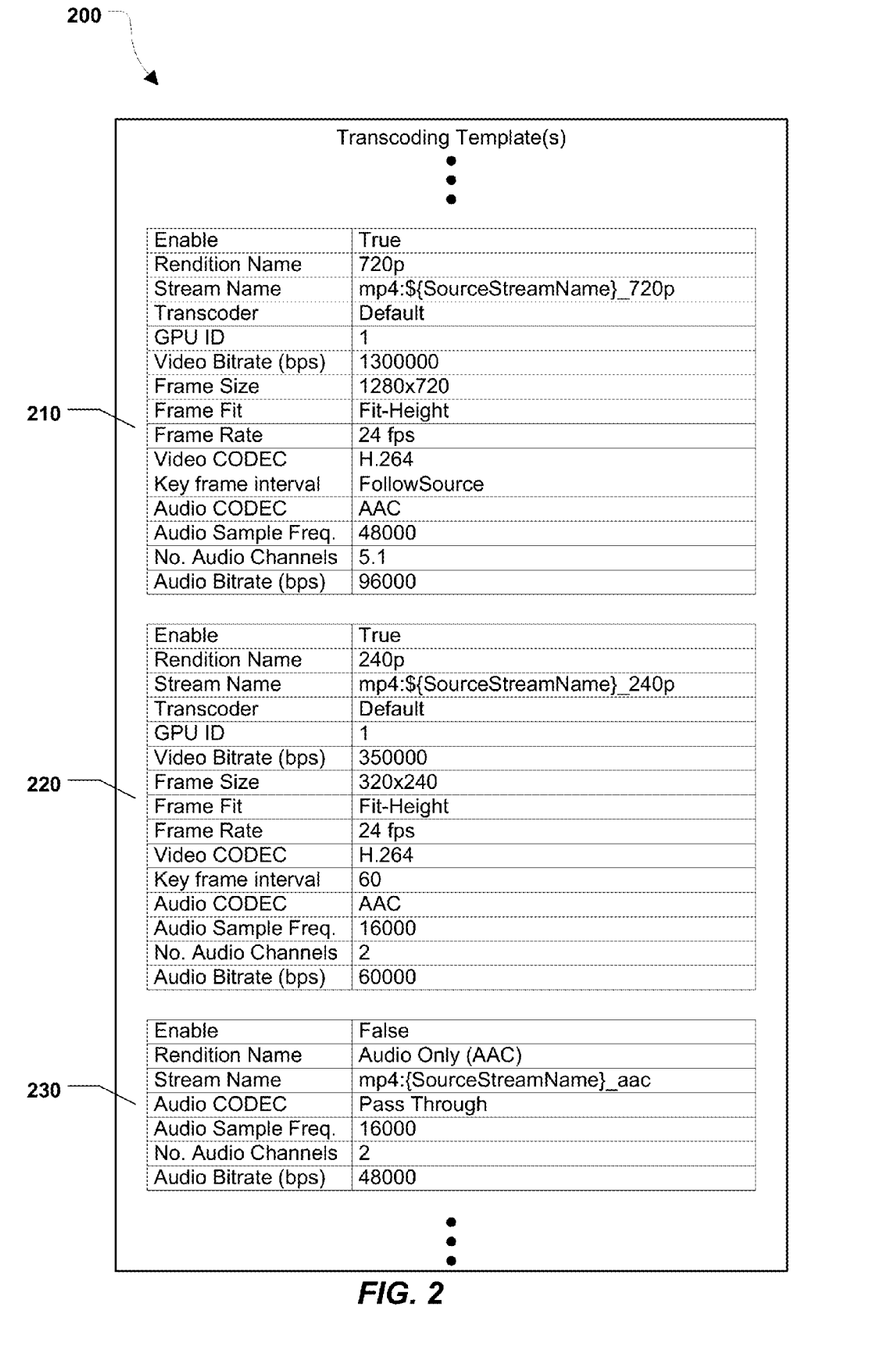
FIG. 2 is a diagram to illustrate a particular example of transcoding templates used by the system of FIG. 1.

FIG. 2 is a diagram to illustrate a particular example (designated 200) of the transcoding template(s) 156 of FIG. 1. As shown in FIG. 2, the transcoding templates 200 may include transcoding settings for a plurality of VOD stream renditions.

For example, in FIG. 2, the transcoding templates 200 include parameters for three different renditions 210, 220, and 230. The first rendition 210 and the second rendition 220 correspond to audio-video content and the third rendition 230 corresponds to audio only content. Each rendition may be enabled or disabled. Renditions that are enabled are available for adaptive streaming (e.g., included in the manifest 120 of FIG. 1). In the example of FIG. 2, the first rendition 210 and the second rendition 220 are enabled, whereas the third rendition 230 is disabled. Each rendition 210, 220, and 230 may have a rendition name (e.g., used for logging) and a stream name that is programmatically generated, as shown. For example, in accordance with the transcoding parameters 200 of FIG. 2, if an input stream is named "media," stream names corresponding to the renditions 210, 220, and 230, will be "media_720p," "media_240p," and "media_aac," respectively.

Transcoding parameters for a stream rendition may include a transcoder identifier (e.g., an identifier of one of the transcoder(s) 155 of FIG. 1). For example, both the 720p rendition 210 and the 240p rendition 220 include a transcoder identifier of "default" (e.g., non-hardware accelerated). In a particular embodiment, the media server 150 may also include hardware-accelerated transcoders that utilize processor instruction sets having instructions specific to graphics/video processing operations. Transcoding parameters may also include a graphics processing unit (GPU) identifier (ID). For example, in media servers including multiple GPUs, different GPUs may be assigned to perform hardware-accelerated transcoding for different renditions.

Transcoding parameters may further include video parameters, such as a video bitrate, a frame size, a frame fit, a frame rate, a video CODEC, and a key frame interval. In FIG. 2, the video bitrate is expressed in bits per second and the frame size is expressed as HEIGHT×WIDTH resolution in pixels. The frame fit may indicate how source video is to be positioned and/or scaled within the frame size. In a particular embodiment, the frame fit may be "Letterbox" (i.e., maintain aspect ratio and scale source video to fit frame size while adding black bars as necessary), "Fit-Height" (i.e., adjust the width to fit the specified height while maintaining aspect ratio), "Fit-Width" (i.e., adjust the height to fit the specified width while maintaining aspect ratio), "Crop" (i.e., maintain aspect ratio and scale to fit frame size by cropping), "Stretch" (i.e., stretch the video to fit the frame size) or "Match Source" (i.e., maintain frame width and height). The frame rate may be expressed in frames per second (fps). In a particular embodiment, supported video CODECs may include "H.264," "H.263," "Pass-Through" (i.e., do not transcode using a video CODEC) and "Disable" (i.e., disable video in the output stream). When the key frame interval is "Follow Source," the output stream includes key frames (e.g., I-frames) at the same interval as the source stream. When the key frame interval is a number N, the output stream includes key frames every N frames.

Transcoding parameters may also include audio parameters, such as an audio CODEC, an audio sample frequency in hertz (Hz), a number of audio channels, and an audio bitrate in bits per second. In a particular embodiment, the audio CODEC may be "AAC," "Pass-Through," or "Disable." In a particular embodiment, the number of audio channels may be 1 (i.e., mono audio), 2 (i.e., stereo audio), 5.1 (i.e., five surround channels and one bass channel), or 7.1 (i.e., seven surround channels and one base channel).

It should be noted that although two renditions are enabled in FIG. 2, this is an example only. In alternate embodiments, more than two or less than two renditions may be enabled (e.g., available) for adaptive streaming. For example, the transcoding templates 200 may include transcoding parameters for a 720p rendition (e.g., for high-bandwidth devices, such as set-top boxes), a 360p rendition (e.g., for medium-bandwidth devices, such as desktop/laptop computers), a 240p rendition (e.g., a low/medium-bandwidth profile for desktop/laptop computers or mobile devices), a 160p rendition (e.g., for low-bandwidth mobile devices), etc.

When a request is received for a portion of an enabled rendition, the requested portion may be generated on the fly using the transcoding parameters corresponding to the rendition. For example, if a request for a portion of the 240p rendition 220 is received, the portion generated by the transcoder(s) 155 of FIG. 1 may have a bitrate of 350 kilobits per second, may be encoded using H.264 encoding, and may have a resolution of 320×240.

FIG. 2 thus illustrates an ability to define transcoding parameters for multiple stream renditions using one or more transcoding templates 200.

Figure 3:
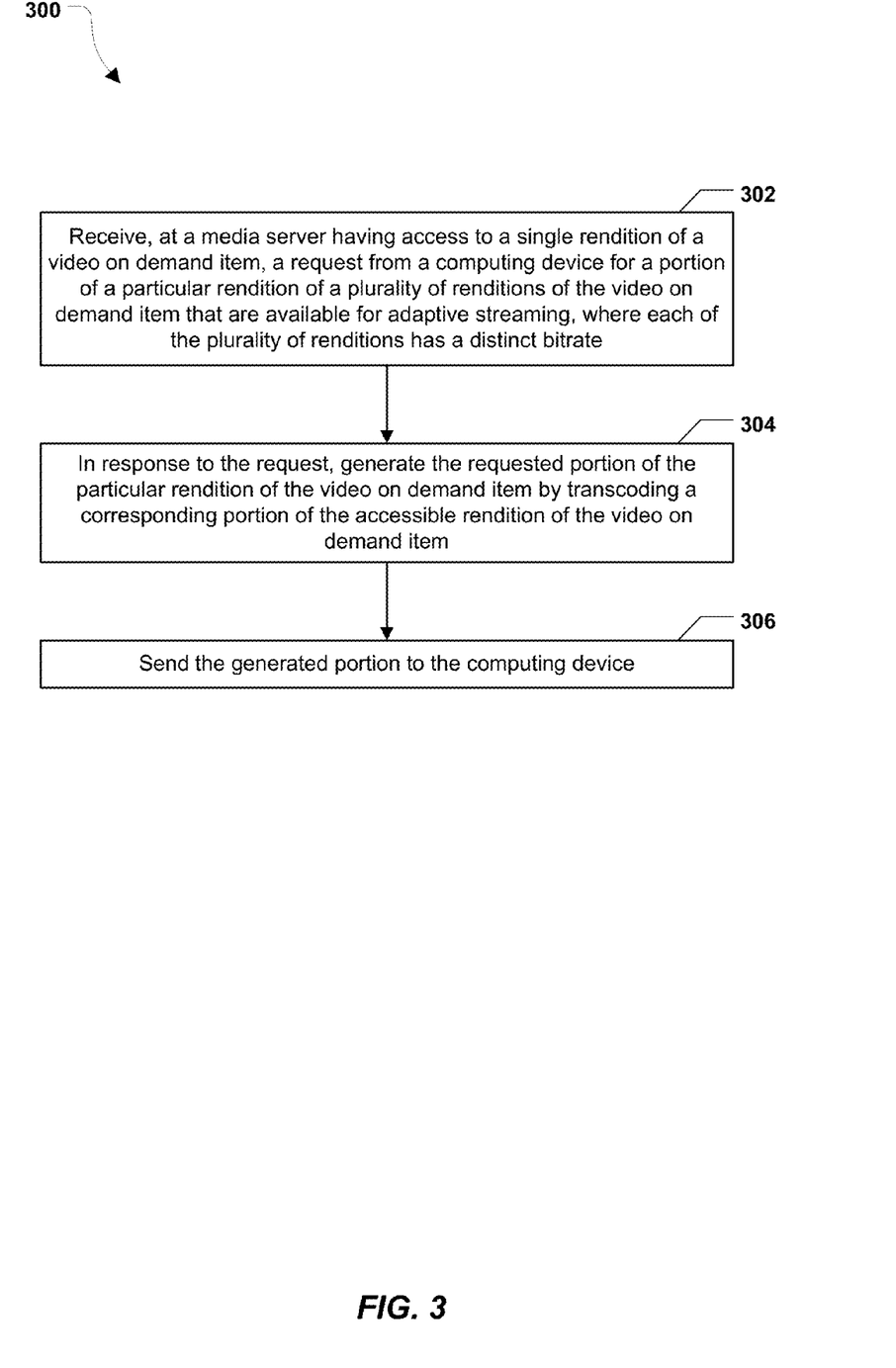
FIG. 3 is a flowchart to illustrate a particular embodiment of a method of performing on the fly transcoding of VOD content for adaptive streaming.

FIG. 3 is a flowchart to illustrate a particular embodiment of a method 300 of performing on the fly transcoding of VOD content for adaptive streaming. In an illustrative embodiment, the method 300 may be performed by the media server 150 of FIG. 1.

The method 300 includes receiving, at a media server having access to a single rendition of a video on demand item, a request from a computing device for a portion of a particular rendition of a plurality of renditions of the video on demand item that are available for adaptive streaming, at 302. Each of the plurality of renditions has a distinct bitrate. For example, in FIG. 1, the media server 150 may receive the request 130 from one of the playback devices 170, such as the computing device 171, the television/set-top box 172, the smartphone 173, or the tablet computer 174. To illustrate, the plurality of available renditions may include the 720p rendition 210 of FIG. 2 and the 240p rendition 220 of FIG. 2, and the request 130 may be for a portion of the 720p rendition 210 of FIG. 2.

The method 300 may also include, in response to the request, generating the requested portion of the particular rendition of the video on demand item by transcoding a corresponding portion of the accessible rendition of the video on demand item, at 304. For example, in FIG. 1, the transcoder(s)

155 may generate the requested portion 161 on the fly based on a corresponding portion of the stored rendition 110. The corresponding portion may be identified as having the same start/end frame numbers, start/end times, or portion number/identifier as the requested portion. The generated portion of the 720p rendition 210 of FIG. 2 may have a 1.3 megabit per second bitrate, a 1280×720 resolution, a 24 frames per second frame rate, etc., as indicated in FIG. 2.

The method 300 may further include sending the generated portion to the computing device, at 306. For example, in FIG. 1, the media server 150 may send the generated portion 161 to the computing device 171.

The method 300 of FIG. 3 may thus enable on the fly generation of VOD renditions for adaptive streaming Generating requested portions of VOD renditions on the fly may reduce the amount of storage space and the number of files involved in implementing adaptive streaming for VOD items.

Figure 4:
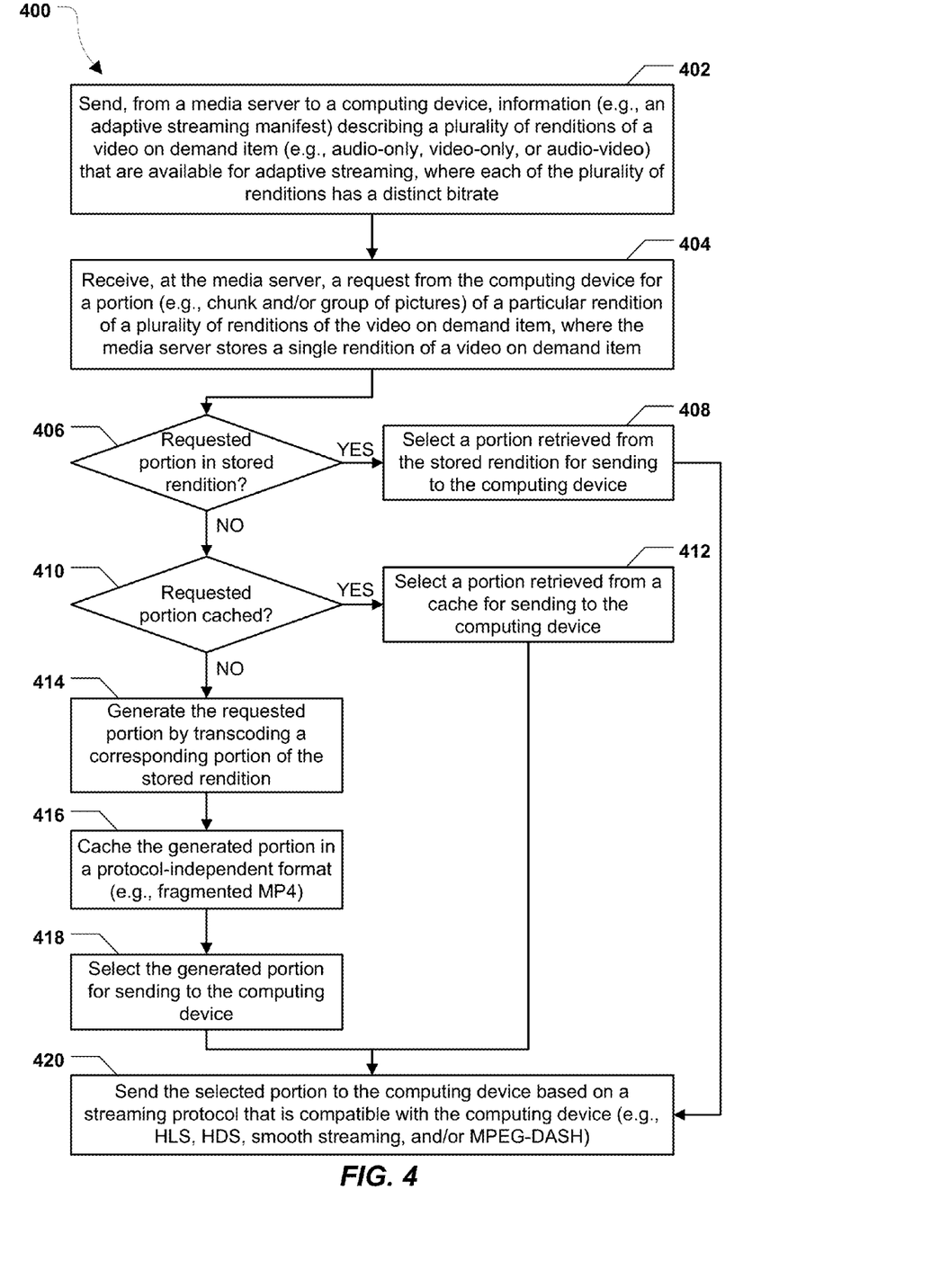
FIG. 4 is a flowchart to illustrate another particular embodiment of a method of performing on the fly transcoding of VOD content for adaptive streaming.

FIG. 4 is a flowchart to illustrate another particular embodiment of a method 400 of performing on the fly transcoding of VOD content for adaptive streaming. In an illustrative embodiment, the method 400 may be performed by the media server 150 of FIG. 1.

The method 400 may include sending, from a media server to a computing device, information describing a plurality of renditions of a video on demand item that are available for adaptive streaming, at 402. Each of the plurality of renditions may have a distinct bitrate. The plurality of renditions may also differ in other aspects, such as frame size, video CODEC, audio CODEC, etc. The information describing the available renditions may be included in an adaptive streaming manifest and the video on demand item may include audio-only, video-only, or audio-video content. For example, in FIG. 1, the media server 150 may send the manifest 120 to the computing device 171.

The method 400 may also include receiving, at the media server, a request from the computing device for a portion (e.g., chunk and/or group of pictures) of a particular rendition of a plurality of renditions of the video on demand item, at 404. The media server stores a single rendition of a video on demand item. Alternately, the media server has access to the single rendition of the video on demand item (e.g., from a remote VOD database or content server). For example, in FIG. 1, the media server 150 may receive the request 130, where the media server stores the single rendition 110 of the VOD item or has access to the single rendition 110 of the VOD item stored at the VOD database/content server 140.

The method 400 may also include determining whether the requested portion is in the stored rendition, at 406. When the requested portion is in the stored rendition, the method 400 may include selecting a portion retrieved from the stored rendition for sending to the computing device at 408. For example, in FIG. 1, when the requested portion is in the stored rendition 110, the media server 150 may retrieve the requested portion from the stored rendition 110. The portion of the stored rendition 110 that corresponds to the requested portion may be identified based on start/end frame numbers, start/end times, or a portion number/identifier of the requested portion included in the request 130. To illustrate, a media player or playback device may request a particular portion of a VOD asset with encoding parameters based on one of the renditions described in the manifest 120 (i.e., the media player or playback device may be restricted to requesting portions that conform to one of the renditions in the manifest 120).

When the requested portion is not in the stored rendition, the method 400 may include determining whether the requested portion is cached, at 410. When the requested portion is cached, the method 400 may include selecting a portion retrieved from a cache for sending to the computing device at 412. For example, in FIG. 1, when the requested portion is stored in the cache 157, the media server 150 may retrieve the requested portion (e.g., the portion 162) from the cache 157. The cache 157 may be indexed by rendition and portion (e.g., portion start/end frame numbers, start/end times, or portion number/identifier).

When the requested portion is not cached, the method 400 may include generating the requested portion by transcoding a corresponding portion of the stored rendition, at 414, caching the generated portion, at 416, and selecting the generated portion for sending to the computing device, at 418. For example, in FIG. 1, when the requested portion is not cached, the transcoder(s) 155 may generate the requested portion (e.g., the portion 161) on the fly from a corresponding portion of the stored rendition 110. In a particular embodiment, the generated portion is cached for subsequent retrieval in a protocol-independent format, such as fragmented MP4.

The method 400 may include sending the selected portion to the computing device based on a streaming protocol that is compatible with the computing device (e.g., HLS, HDS, smooth streaming, and/or MPEG-DASH), at 420. For example, in FIG. 1, the media server 150 may send the portion 161 or the portion 162 to the computing device 171 (or another one of the playback devices 170). In a particular embodiment, the media server 150 may fragment and encapsulate the portion 161 or the portion 162 based the streaming protocol to be used.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the media server 150 of FIG. 1, the VOD database/VOD content server 140 of FIG. 1, the desktop/laptop computing device 171 of FIG. 1, the TV/set-top box 172 of FIG. 1, the smartphone 173 of FIG. 1, the tablet computer 174 of FIG. 1, the media server/stream relay server 181 of FIG. 1, a server (e.g., edge server) of the CDN 182 of FIG. 1, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or a processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

In a particular embodiment, a method includes receiving, at a media server, a request from a computing device for a portion of a particular rendition of a plurality of renditions of a video on demand item that are available for adaptive streaming. Each of the plurality of renditions has a distinct bitrate. The media server has access to a single rendition of the video on demand item. The method also includes, in response to the request, generating the requested portion of the particular rendition of the video on demand item by transcoding a corresponding portion of the accessible rendition of the video on demand item. The method further includes sending the generated portion to the computing device.

In another particular embodiment, a media server includes a processor and a memory storing a single rendition of a video on demand item. The media server also includes a network interface configured to receive a request from a computing device for a portion of a particular rendition of a plurality of renditions of the video on demand item that are available for adaptive streaming. Each of the plurality of renditions has a distinct bitrate. The network interface is also configured to send the requested portion to the computing device. The media server further includes a transcoder executable by the processor to, in response to the request, generate the requested portion of the video on demand item by transcoding a corresponding portion of the stored rendition of the video on demand item.

In another particular embodiment, a computer-readable storage device stores instructions that, when executed by a computer, cause the computer to receive, at a media server, a request from a computing device for a portion of a particular rendition of a plurality of renditions of the video on demand item that are available for adaptive streaming Each of the plurality of renditions has a distinct bitrate. The media server has access to a single rendition of the video on demand item. The instructions are also executable to cause the computer to, when the requested portion is part of the stored rendition, send a portion retrieved from the stored rendition to the computing device in response to the request. The instructions are further executable by the processor to, when the requested portion is not part of the stored rendition and is stored in a cache of the media server, send a portion retrieved from the cache to the computing device in response to the request. The instructions are executable by the processor to, when the requested portion is not stored in the cache at the media server, generate the requested portion by transcoding a corresponding portion of the accessible rendition and send the generated portion to the computing device in response to the request.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a media server, a request from a computing device for a first portion of a plurality of portions of a particular rendition of content that is available for adaptive streaming, wherein the request is received while the media server has access to a single rendition of the content;
   when the first portion of the particular rendition is part of the single rendition, sending the first portion, but not other portions, of the particular rendition retrieved from the single rendition to the computing device in response to the request;
   when the first portion of the particular rendition is not part of the single rendition:
      retrieving a portion of the single rendition that corresponds to the first portion of the particular rendition of the content;
      generating the first portion, but not other portions, of the particular rendition by transcoding the retrieved portion of the single rendition of the content;
      storing the first portion of the particular rendition in a cache of the media server; and
      sending the first portion, but not other portions, of the particular rendition to the computing device in response to the request;
   receiving an updated transcoding template at the media server, the updated transcoding template including one or more updated transcoding parameters for an updated rendition of the content; and removing portions of one or more outdated renditions from the cache, while maintaining the first portion of the particular rendition in the cache, the one or more outdated renditions identified based on the updated transcoding template.

2. The method of claim 1, further comprising when the first portion of the particular rendition is not part of the single rendition and prior to generating the first portion of the particular rendition, determining whether the first portion of the particular rendition is stored in the cache.

3. The method of claim 2, wherein generating the first portion of the particular rendition occurs in response to determining that the first portion of the particular rendition is not stored in the cache.

4. The method of claim 1, wherein sending the first portion of the particular rendition to the computing device includes sending the first portion of the particular rendition based on a streaming protocol that is compatible with the computing device.

5. The method of claim 4, wherein the streaming protocol includes: HTTP dynamic streaming (HDS), smooth streaming, or motion picture experts group (MPEG) dynamic adaptive streaming over HTTP (MPEG DASH).

6. The method of claim 1, wherein the stored first portion is in a format that is independent of a plurality of output protocols used to send the first portion of the particular rendition to one or more requesting devices.

7. The method of claim 1, wherein the cache is indexed based on the first portion of the particular rendition.

8. The method of claim 1, wherein the first portion of the particular rendition comprises a group of pictures that includes an intra-coded frame (I-frame) and one or more additional frames that include difference information relative to the I-frame.

9. The method of claim 1, further comprising, in response to a subsequent request for the first portion of the particular rendition:
retrieving the first portion of the particular rendition from the cache; and
sending the retrieved first portion of the particular rendition in response to the subsequent request.

10. The method of claim 1, further comprising, prior to receiving the request, sending information to the computing device, the information describing a plurality of renditions of the content that are available for adaptive streaming.

11. The method of claim 1, wherein the request includes information specifying the first portion of the particular rendition by a portion number, a portion identifier, a frame start number, a frame end number, a portion start time, a portion end time, or any combination thereof.

12. The method of claim 1, wherein the retrieved first portion of the single rendition of the content is stored in a non-volatile memory of the media server.

13. The method of claim 1, wherein a plurality of renditions of the content are available for adaptive streaming from the media server, and wherein the plurality of renditions and one or more transcoding parameters are identified by a transcoding template stored at the media server.

14. The method of claim 13, wherein the one or more transcoding parameters include, for a rendition of the content, a key frame interval of the rendition, a frame size of the rendition, a frame rate of the rendition, information regarding one or more coders/decoders (CODECs) associated with the rendition, an audio sample frequency of the rendition, and a number of audio channels of the rendition.

15. The method of claim 1, further comprising:
in response to a subsequent request for a first portion of the updated rendition, generating the first portion of the updated rendition based on the one or more updated transcoding parameters.

16. A media server comprising:
a processor;
a memory;
a network interface configured to:
receive a request from a computing device for a first portion of a plurality of portions of a particular rendition of content that is available for adaptive streaming, wherein the request is received while the media server has access to a single rendition of the content;
when the first portion of the particular rendition is part of the single rendition, send the first portion, but not other portions, of the particular rendition retrieved from the single rendition to the computing device in response to the request; and
when the first portion of the particular rendition is not part of the single rendition, send a generated first portion, but not other portions, of the particular rendition to the computing device in response to the request; and
a transcoder executable by the processor to:
in response to the request and when the first portion of the particular rendition is not part of the single rendition:
retrieve a portion of the single rendition that corresponds to the first portion of the particular rendition of the content;
generate the first portion, but not other portions, of the particular rendition by transcoding the retrieved portion of the single rendition of the content;
store the first portion of the particular rendition in a cache of the media server;
receive an updated transcoding template, the updated transcoding template including one or more updated transcoding parameters for an updated rendition of the content; and
remove portions of one or more outdated renditions from the cache while maintaining the first portion of the particular rendition in the cache, the one or more outdated renditions identified based on the updated transcoding template.

17. The media server of claim 16, wherein the cache is configured to store the first portion of the particular rendition for subsequent retrieval in response to a subsequent request for the first portion of the particular rendition, wherein the cache comprises disk-based memory, random access memory (RAM), or a combination thereof.

18. The media server of claim 16, wherein:
the transcoder is configured to simultaneously generate a plurality of renditions of the content from the retrieved first portion of the single rendition of the content, and
the network interface is further configured to simultaneously send each of the plurality of renditions of the content to another media server, a stream relay server, a server associated with a content delivery network (CDN), or any combination thereof.

19. A computer-readable storage device storing instructions that, when executed by a computer, cause the computer to:
receive, at a media server, a request from a computing device for a first portion of a plurality of portions of a particular rendition of content that is available for adaptive streaming, wherein the request is received while the media server has access to a single rendition of the content;

when the first portion of the particular rendition is part of the single rendition, send the first portion, but not other portions, of the particular rendition retrieved from the single rendition to the computing device in response to the request;

when the first portion of the particular rendition is not part of the single rendition:
- retrieve via a network, from a server remote to the media server, a portion of the single rendition that corresponds to the first portion of the particular rendition of the content;
- generate the first portion, but not other portions, of the particular rendition by transcoding the retrieved portion of the single rendition of the content;
- store the first portion of the particular rendition in a cache of the media server; and
- send the first portion, but not other portions, of the particular rendition to the computing device in response to the request;

receive an updated transcoding template at the media server, the updated transcoding template including one or more updated transcoding parameters for an updated rendition of the content; and removing portions of one or more outdated renditions from the cache, while maintaining the first portion of the particular rendition in the cache, the one or more outdated renditions identified based on the updated transcoding template.

20. The computer-readable storage device of claim 19, wherein the cache is configured to store the first portion of the particular rendition for subsequent retrieval in response to a subsequent request for the first portion of the particular rendition, wherein the cache comprises disk-based memory, random access memory (RAM), or a combination thereof.

* * * * *